United States Patent [19]
Johnson

[11] Patent Number: 5,228,360
[45] Date of Patent: Jul. 20, 1993

[54] CRUISE/SPEED CONTROL SYSTEM FOR HYDROSTATIC DRIVE

[75] Inventor: Ronald L. Johnson, Bloomington, Minn.

[73] Assignee: The Toro Company, Minneapolis, Minn.

[21] Appl. No.: 736,179

[22] Filed: Jul. 26, 1991

[51] Int. Cl.⁵ .......................... G05G 1/14; G05G 1/04
[52] U.S. Cl. ........................................ 74/512; 74/526; 74/474; 74/542
[58] Field of Search ................ 74/526 X, 512, 474 X, 74/470, 542, 513, 539, 560, 561, 562, 564

[56] References Cited

U.S. PATENT DOCUMENTS

| | | | |
|---|---|---|---|
| 3,910,133 | 10/1975 | Oestmann | 74/474 X |
| 4,010,657 | 3/1977 | Amdall | 74/474 X |
| 4,217,789 | 8/1980 | Larson | 74/470 |
| 4,281,737 | 8/1981 | Molzahn | 180/307 |
| 4,516,439 | 5/1985 | Sagaser | 74/470 |
| 4,543,850 | 10/1985 | Bednar et al. | 74/512 |
| 4,553,626 | 11/1985 | Kazmierczak et al. | 180/307 |
| 4,620,575 | 11/1986 | Cuba et al. | 180/307 |
| 4,708,378 | 11/1987 | Ingenhoven | 74/470 X |
| 4,727,710 | 3/1988 | Kuhn | 56/10.2 |
| 4,759,417 | 7/1988 | Wanie et al. | 180/6.34 |
| 5,022,477 | 6/1991 | Wanie | 74/512 X |
| 5,094,326 | 3/1992 | Schemelin et al. | 74/474 |

OTHER PUBLICATIONS

Toro Parts Catalog, "Groundsmaster 580-D Traction Unit With Accessories", pp. 1, 7, 9 and 13, 1991.
Toro Parts Catalog, "Cruise Control Groundsmaster 300 Series w/Power Steering", pp. 1, 2 and 3, 1988.

Primary Examiner—Vinh T. Luong
Attorney, Agent, or Firm—John W. Bunch

[57] ABSTRACT

A cruise control system (10) for use with a hydrostatic drive system having a traction pedal (12) includes a pivotal link (42) and stops (44 and 46) comprising a lost motion connection between the traction pedal and the traction control linkage (30). Selective retention of the pump control lever is accomplished by a pair of electromagnets (64) responsive to a switch (88) associated with the lost motion connection.

10 Claims, 4 Drawing Sheets

CRUISE/SPEED CONTROL SYSTEM FOR HYDROSTATIC DRIVE

TECHNICAL FIELD

The present invention relates generally to a speed control arrangement. More particularly, this invention concerns an electromechanical cruise control system for use in conjunction with a traction pedal in the hydrostatic drive system of an off-road vehicle, such as a commercial riding mower.

BACKGROUND ART

Cruise control systems for maintaining a desired vehicle speed have been available heretofore, and their benefits are well known. One benefit is to reduce operator or driver fatigue. Such systems are often found on automobiles. In automotive applications, cruise control systems are generally interconnected with the brake pedal and can be disengaged either by turning them off or tapping the brake pedal to actuate a cut-out switch. However, some vehicles such as commercial riding mowers utilize hydrostatic drive systems with dynamic braking characteristics. Such vehicles typically have a traction pedal which is connected through a linkage to a lever on the pump in order to control the direction and speed of flow through the motors in the hydraulic circuit. Individually controlled brakes are sometimes provided for steering assist. However, brake systems are typically not provided in this type of vehicle, except perhaps for a parking brake.

Speed controls for riding mowers and other hydrostatically driven vehicles have also been available heretofore. For example, U.S. Pat. No. 4,620,575 to Cuba, et al shows a speed control for a lawn and garden vehicle. U.S. Pat. No. 4,553,626 to Kazmierczak, et al, U.S. Pat. No. 4,281,737 to Molzahn, and U.S. Pat. No. 4,727,710 to Kuhn are representative of the prior art in this regard. These systems tend to be relatively complicated and are also interconnected with the brake pedals. The Toro system incorporating electromagnets responsive to a switch associated with the brake pedal on a riding mower. However, there has not been available heretofore a cruise control system for vehicles having hydrostatic drives with traction pedals but no brake pedals.

There is thus a need for an improved cruise control system which is adapted for use on a hydrostatically driven vehicle having only a traction pedal but no brake pedal.

SUMMARY OF INVENTION

The present invention comprises a cruise control system which overcomes the foregoing and other difficulties associated with the prior art. In accordance with the invention, there is provided an improved cruise control system which is adapted for use with a traction pedal in a hydrostatic drive system of a vehicle such as a commercial riding mower. The cruise control system herein includes a link coupled between the traction pedal and a linkage leading to the speed control lever on the pump of the hydrostatic drive system. Relative pivotal movement between the link and traction pedal is limited by stops, which are engaged in either forward or reverse, but are normally held out of engagement by a spring. The speed control lever on the pump is selectively retained in the position corresponding to the desired direction and speed by electromagnets responsive to a switch carried on the link, which senses any disengagement from the stops when the operator touches the traction pedal in order to deactuate the cruise control.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
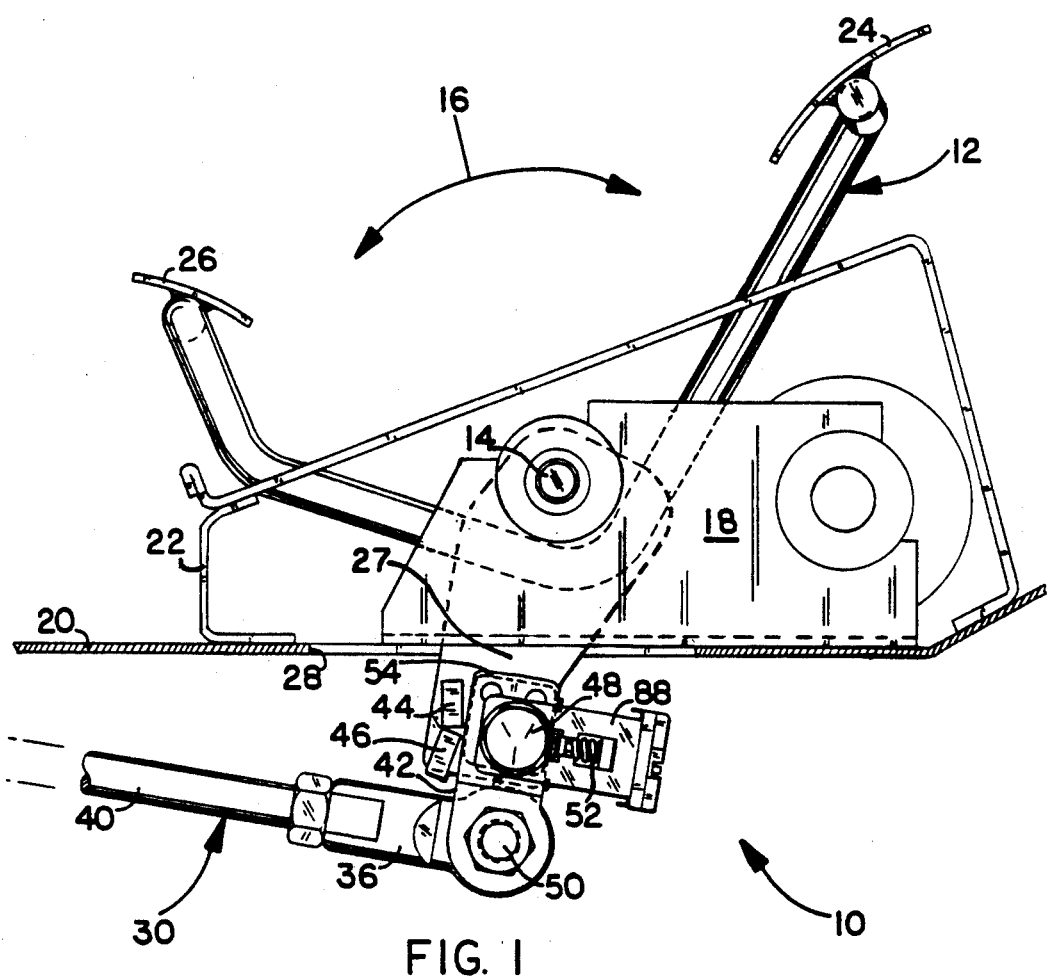
FIG. 1 is a side view, partially cut away, of a cruise control system incorporating the invention.
Figure 2:
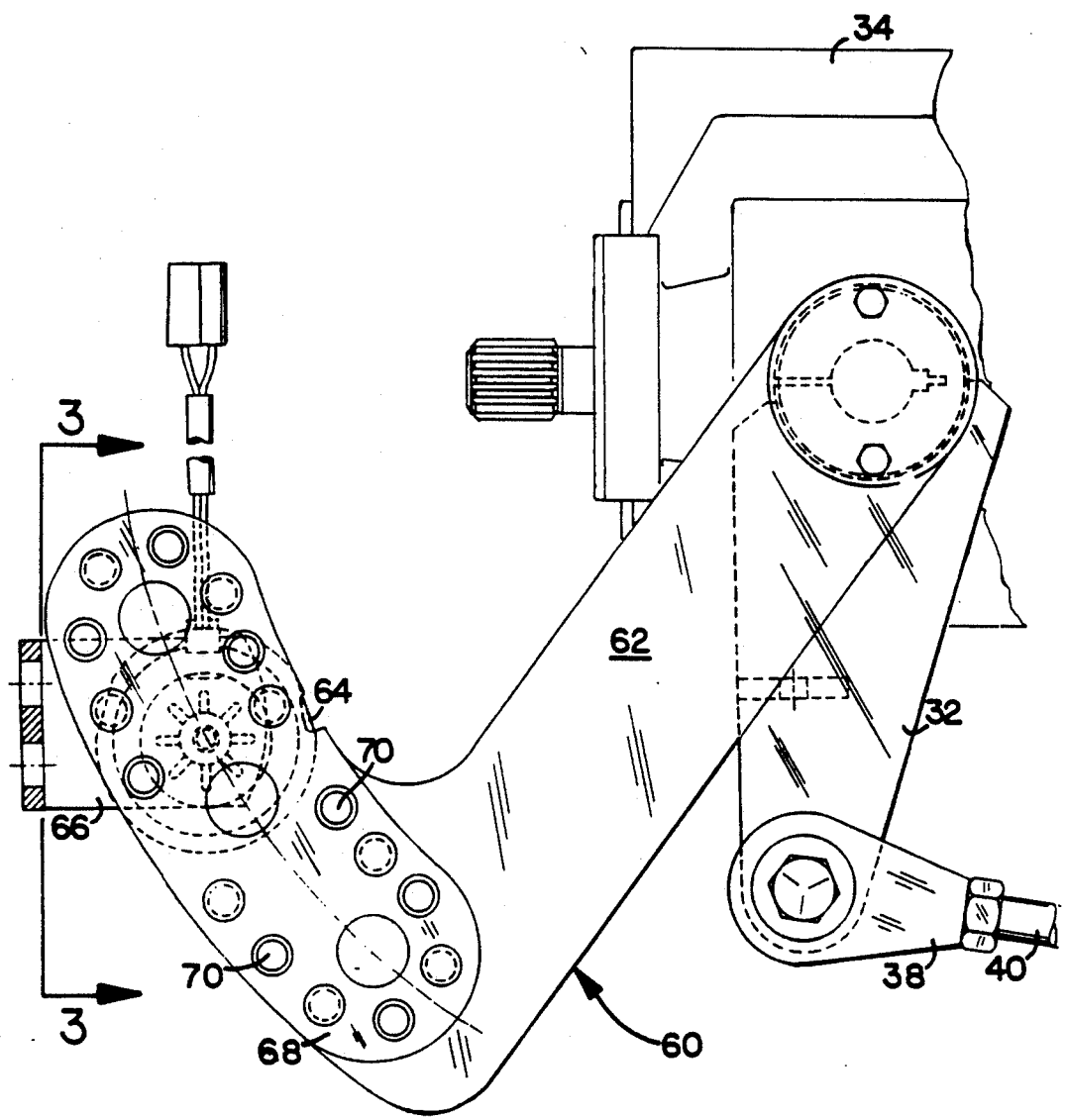
FIG. 2 is a continuation of FIG. 1.

Referring now to the Drawings, wherein like reference numerals designate like or corresponding elements throughout the views, and particularly referring to FIGS. 1 and 2 there is shown a cruise control system 10 incorporating the invention. As will be explained more fully hereinafter, the cruise control system 10 is of relatively straight forward construction and is adapted for connection directly between the traction pedal of a vehicle having a hydrostatic drive system but no separate brake pedal, such as a commercial riding mower. Although the cruise control system herein is particularly adapted for use with commercial riding mowers in which it is desirable to maintain a constant groundspeed to achieve proper turf cut quality, it will be understood that it could be used with outer types of equipment.

The cruise control system 10 includes a conventional traction pedal 12 which is supported on a transverse pin 14 for pivotal movement in the forward and reverse directions indicated by arrows 16. The pin 14 in turn is supported on a bracket 18 secured to the floor 20 of the vehicle. The bracket 18 is located underneath a footrest 22 which is also secured to the vehicle floor 20 adjacent to the traction pedal 12. The upper portion of the traction pedal 12 is of generally a V-shaped configuration having two pads 24 and 26 which the operator depresses to control the direction and speed of the vehicle.

The lower portion 27 of the traction pedal 12 extends through an opening 28 in the floor 20 and is coupled to a linkage 30 which in turn is coupled to the speed lever 32 on pump 34. The linkage 30 includes a pair of ball joints 36 and 38 connected to opposite ends of an adjustable traction rod assembly 40.

Figure 1A:
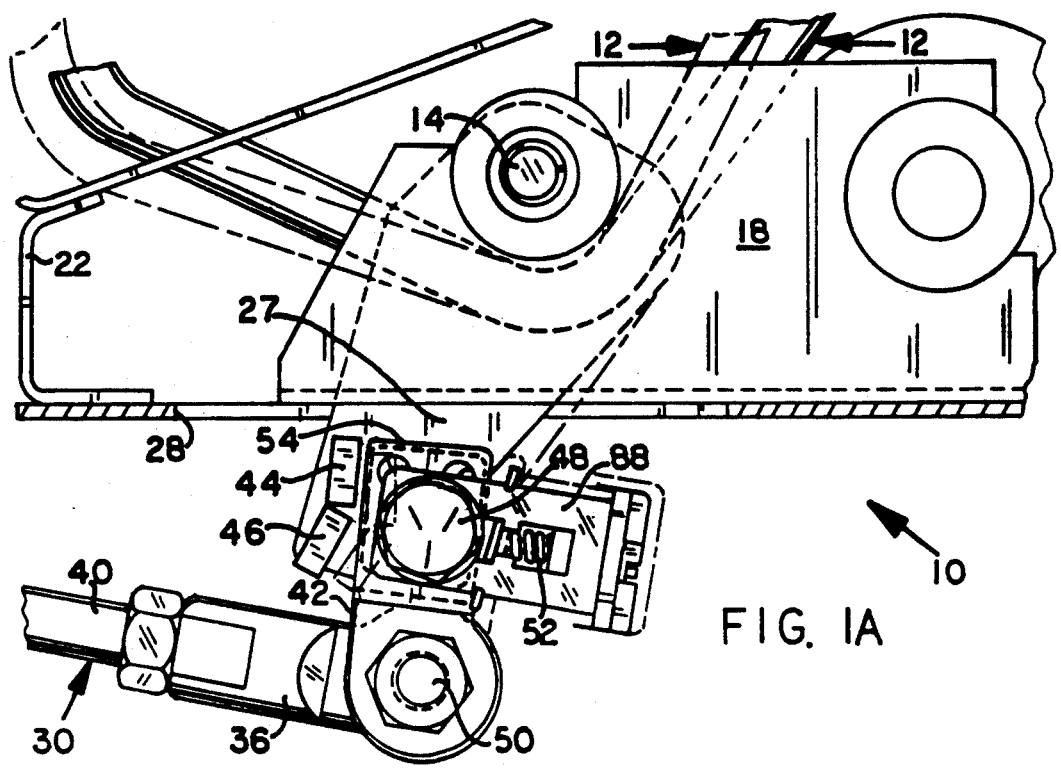
FIGS. 1A and 1B are detail views illustrating operation of the lost motion connection between the traction pedal and transmission linkage.
Figure 1B:
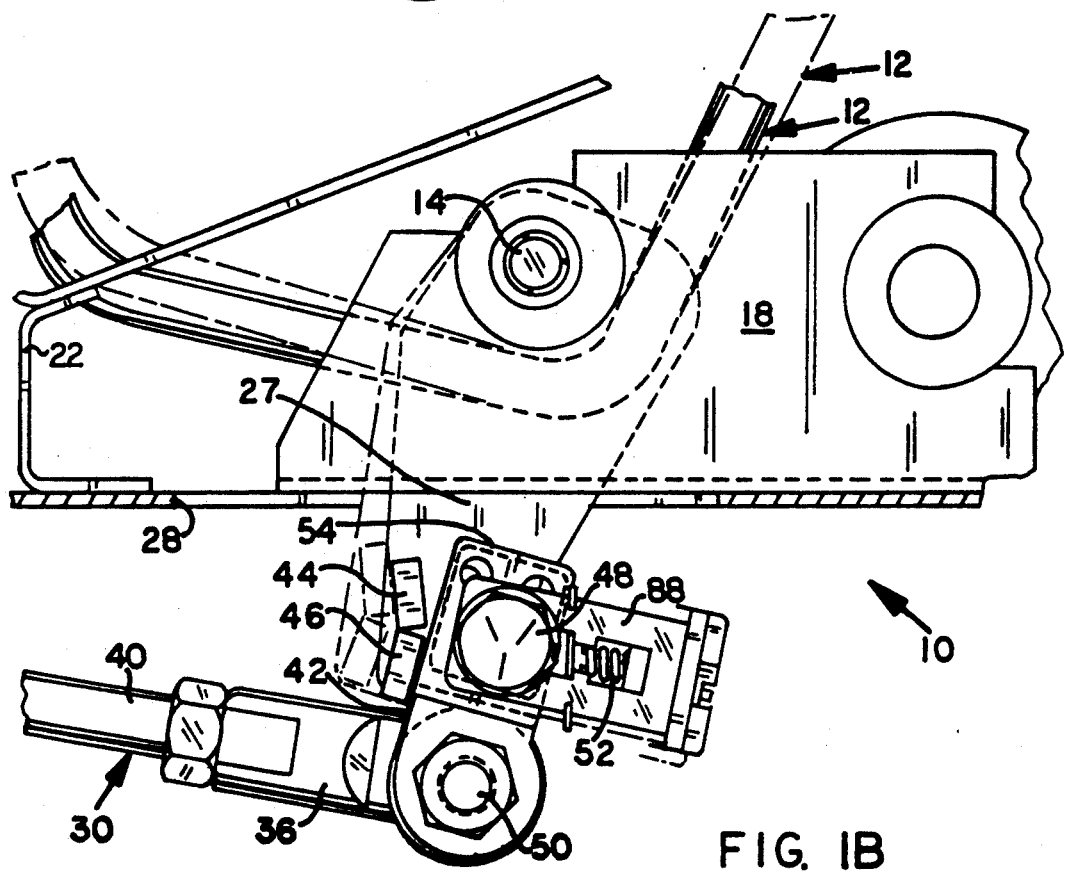

Referring particularly to FIG. 1, a link 42 is coupled between the lower portion 27 of the traction pedal 12 and linkage 30 for relative pivotal movement therewith, which is limited by stops 44 and 46 on the lower end of the traction pedal. The link 42 is coupled at one end to the lower portion 27 of the traction pedal 12 by a transverse bolt or pin 48, and is coupled at the other end to linkage 30 by another transverse bolt o pin 50. When the operator depresses pad 24 of the traction pedal 12 to drive the vehicle forward, the entire pedal rotates about pin 14 while link 42 rotates about bolt 48 in the opposite direction until engaging stop 44, after which the linkage 30 moves rearward to actuate the pump lever 32. See FIG. 1A. The opposite occurs when the operator depresses pad 26 downwardly and link 42 engages stop 46 to actuate the pump lever 32 in the reverse direction. See FIG. 1B. It will thus be appreciated that the link 42 and stops 44 and 46 function as a lost motion connection between the traction pedal 12 and linkage 30. A spring 52 normally urges the link 42 out of engagement with either stop 44 or stop 46, into a neutral position, as shown in FIG. 1. This comprises a significant feature of the present invention.

In accordance with the preferred embodiment, a flat plastic washer or spacer 54 is provided between link 42 and the lower portion 27 of the traction pedal 12 for antifriction purposes.

Figure 3:
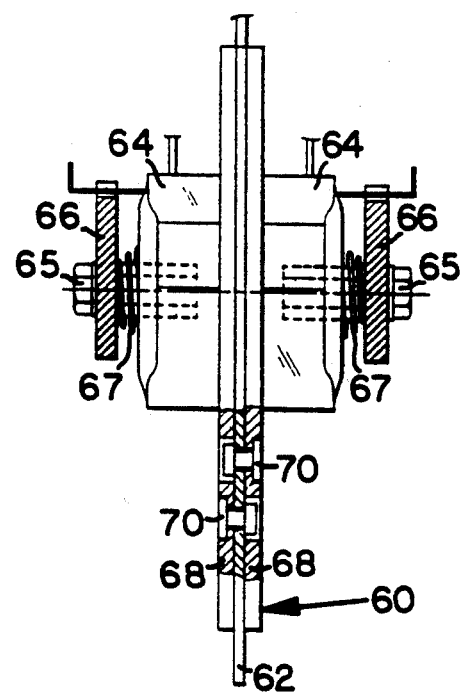
FIG. 3 is an end view of the cruise control system herein.

Referring now to FIGS. 2 & 3, an arm assembly 60 is also secured to the pump lever 32 for movement therewith. The arm assembly includes a generally L-shaped non-magnetic arm 62, one end of which is secured to the traction pump control lever 32. The other free end of arm 62 extends between an opposing pair of spaced-apart electromagnets 64. Each electromagnet 64 is supported on pivots 65 on a bracket 66, and are normally urged inwardly away from bracket 66 by springs 67. In accordance with the preferred construction, a pair of plated iron ads 68 are secured by rivets 70 to opposite sides of the lower portion of arm 62 to enhance magnetic coupling with the electromagnets 64. The capacity of the electromagnets 64 together with the mechanical advantage provided by arm 62 are sufficient to hold the pump lever 32 in the position corresponding to the desired direction and speed, subject to manual override by the operator through the traction pedal 12 and linkage 30.

Figure 4:
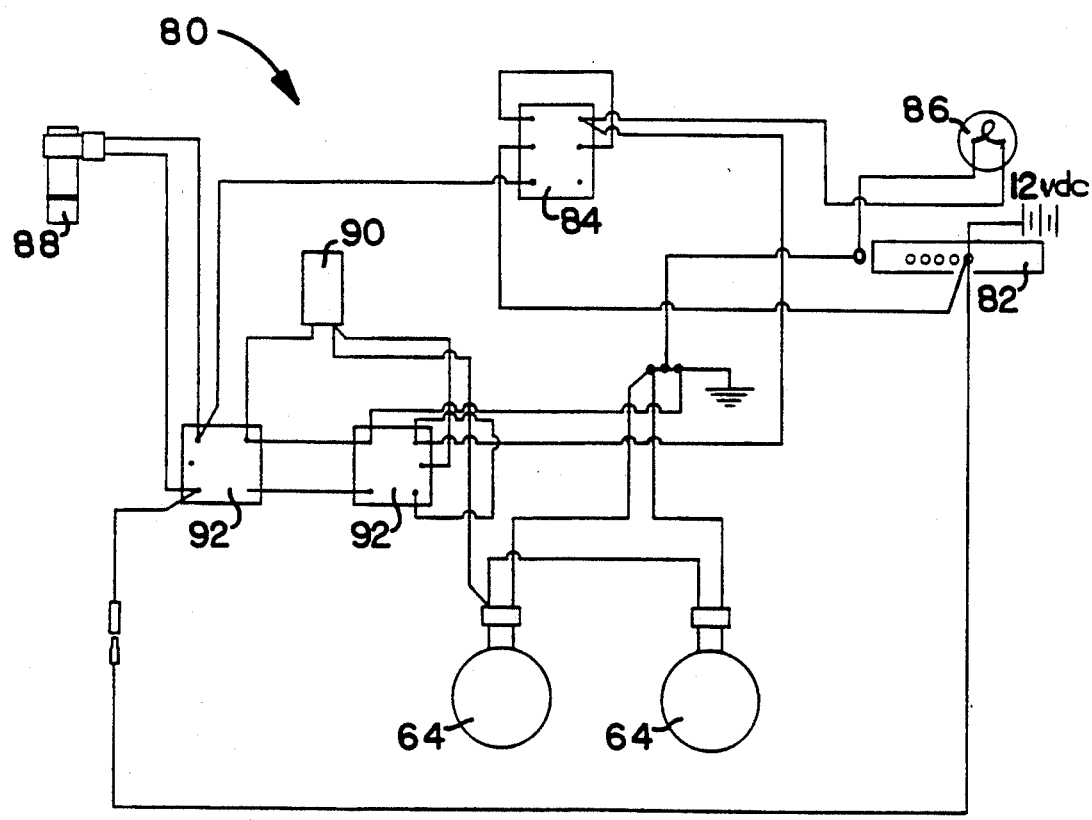
FIG. 4 is a schematic diagram of the electrical wiring for the cruise control system herein.

The cruise control system 10 can be selectively engaged or disengaged via the circuit 80 shown in FIG. 4. Electrical power for the cruise control system 10 is received through the terminal strip 82 which is connected to the ignition system of the vehicle. A three-position (off-on- engage) switch 84 on the control panel (not shown) is turned from "off" to "on" to initialize the system. This can be done either before or while the operator depresses the traction pedal 1 to achieve the desired speed. After the desired speed has been achieved, the switch 84 is then moved to the "engage" position and held there to activate the electromagnets 64, after which the operator can release the traction pedal 12. Light 86 on the control panel is illuminated while the electromagnets 64 are activated. Once the operator releases the traction pedal 12 he then releases the switch 84 from engage and it returns to the "on" position.

The cruise control system 10 can be disengaged in several ways. One way is to turn switch 84 to the off position, thus deactivating the electromagnets 64. Another way is for the operator to depress the traction pedal 12 slightly, in either direction, which in turn causes a change in the relative position between link 42 and one of the stops 44 or 46 which is sensed by normally open switch 88. Another way to disengage the cruise control system 10 is to turn off the vehicle ignition. Finally, if there should be a failure of some sort in circuit 80, the cruise control system 10 can also be disengaged manually by the operator by overriding the magnetic coupling with the traction pedal 12.

In the preferred embodiment, a capacitor 90 is connected across the relays 92 between switches 84 and 88 and the electromagnets 64 to prevent possible interruption of power to the electromagnets by drop out of the relays from vibration or shock during operation of the vehicle.

From the foregoing, it will apparent that the cruise control system herein has several advantages over of the prior art. The cruise control system herein is adapted for connection directly between the traction pedal and the traction rod assembly leading to the pump lever. It can readily be disengaged via the system switch, the vehicle ignition switch, by touching the traction pedal, or by manual override. The system herein can be sold as a kit for retrofit to existing commercial with hydrostatic drives. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications, and-/or rearrangements of elements falling within the scope of the invention is defined by the following claims.

What is claimed is:

1. A speed control system for use with a hydrostatic drive system having a pivotal traction pedal connected to a direction/speed control lever on a pump, which comprises:

a link coupled between the traction pedal and the control lever, said link being pivotal in the forward and rearward directions relative to the traction pedal;

stop means mounted for movement with the traction pedal for limiting relative pivotal movement between said link and the traction pedal, said link being normally engaged with said stop means during drive in either the forward or rearward direction;

spring means for normally urging said link out of engagement with said stop means and into a neutral position relative to the traction pedal;

switch means mounted for movement with the traction pedal for sensing movement of said link away from the neutral position; and electromagnetic means responsive to said switch means for selectively retaining the control lever in a predetermined position corresponding to the desired speed.

2. The speed control system of claim 1, wherein said stop means is secured to a portion of said traction pedal, and is positioned and arranged for stopping engagement with said link in the forward and rearward directions after predetermined limited relative pivotal movement therebetween.

3. The speed control system of claim 1, wherein said switch means is normally open and said electromagnetic means is normally deenergized.

4. A speed control system for use with a hydrostatic drive system having a pivotal pedal connected by a linkage to a control lever on a pump, which comprises:

a link coupled between the traction pedal and the linkage, said link being pivotal in the forward and rearward directions relative to the traction pedal;

stop means for limiting relative pivotal movement between said link and the traction pedal;

said stop means being secured to a portion of said traction pedal, and being positioned and arranged for stopping engagement with said link in the forward and rearward directions after predetermined limited relative pivotal movement therebetween;

said stop means including a pair of stops arranged in a shallow, generally V-shaped orientation for stopping engagement with said link;

spring means for normally urging said link out of engagement with said stop means and into a neutral position relative to the pedal;

switch means mounted for movement with the traction pedal for sensing movement of said link away from the neutral position; and electromagnetic means responsive to said switch means for selectively retaining the control lever in a predetermined position corresponding to the desired speed.

5. A speed control system for use with a hydrostatic drive system having a pivotal traction pedal connected by a linkage to control lever on a pump, which comprises:

a link coupled between the traction pedal and the linkage, said link being pivotal in the forward and rearward directions relative to the traction pedal;

stop means for limiting relative pivotal movement between said link and the traction pedal;

spring means for normally urging said link out of engagement with said stop means and into a neutral position relative to the traction pedal;

switch means mounted for movement with the traction pedal for sensing movement of said link away from the neutral position; and electromagnetic means responsive to said switch means for selectively retaining the control lever in a predetermined position corresponding to the desired speed;

said electromagnetic means including:

a pivotal arm secured at one end to the lever on the pump for movement therewith;

an iron pad secured to the other end of said arm for movement therewith;

an electromagnet located along the path of movement of said iron pad on said arm; and control means including said switch means for selectively energizing said electromagnet.

6. In a vehicle having a hydrostatic drive system with a pivotal traction pedal connected by a transmission linkage to a speed control lever on a pump, a speed/cruise control system comprising:

means connected between the traction pedal and the transmission linkage for defining a lost motion connection;

electromagnetic means for selectively effecting a magnetic coupling in order to retain the speed control lever in a predetermined position; and control means including a switch responsive to said lost motion connection means for selectively energizing said electromagnetic means in order to retain the speed control lever in a position corresponding to the desired vehicle speed.

7. The speed/cruise control system of claim 6, wherein said lost motion connection means comprises:

a link coupled between the traction pedal and the transmission linkage, said link being pivotal in the forward and rearward directions relative to the traction pedal;

stop means for limiting relative pivotal movement between said link and the traction pedal, said link being engaged with said stop means during drive in either the forward or rearward directions; and spring means for normally urging said link out of engagement with said stop means and into a neutral position.

8. The speed/cruise control system of claim 6, wherein said control means comprises:

first switch means for selectively manually energizing said electromagnetic means;

second switch means responsive to said lost motion connection for selectively deenergizing said electromagnetic means; and circuit means including a relay and capacitor connected between said first and second switch means and said electromagnetic means.

9. In a vehicle having a hydrostatic drive system with a pivotal traction pedal connected by a transmission linkage to a speed control lever on a pump, a speed/cruise control system comprising:

means defining a lost motion connection between the traction pedal and the transmission linkage;

electromagnetic means for selectively effecting a magnetic coupling in order to retain the speed control lever in a predetermined position; and control means for selectively energizing said electromagnetic means in order to retain the speed control lever in a position corresponding to the desired vehicle speed;

said electromagnetic means including:

a pivotal arm secured at one end to the speed control lever of the pump for movement therewith;

a pair of iron pads secured to opposite sides of the other end of said arm for movement therewith; and a pair of opposing electromagnets located along the path of said iron pads, said electromagnets being normally deenergized.

10. In a vehicle having a hydrostatic drive system with a pivotal traction pedal connected by a linkage to a speed control lever on a pump, a speed/cruise control system comprising:

a link coupled between the traction pedal and the linkage, said link being pivotal in the forward and rearward directions relative to the traction pedal;

stop means for limiting relative pivotal movement between said link and the traction pedal, said link being normally engaged with said stop means during drive in either the forward or rearward direction;

spring means for normally urging said link out of engagement with said stop means and towards a neutral position relative to the traction pedal;

switch means for sensing movement of said link away from the neutral position;

a pivotal arm secured at one end to the control lever of the pump for movement therewith;

an iron pad secured to the other end of said pivotal arm for movement therewith;

an electromagnet located along the path of movement of said iron pad; and control means responsive to said switch for selectively energizing said electromagnet in order to retain the pump lever in a predetermined position corresponding to the desired speed.

* * * * *